(12) United States Patent
McVicar

(10) Patent No.: US 6,404,417 B1
(45) Date of Patent: Jun. 11, 2002

(54) DIRECT DRIVE ROTATIONAL SENSOR ADAPTED TO WITHSTAND OFF-AXIS LOADING

(75) Inventor: David McVicar, El Dorado, CA (US)

(73) Assignee: Logitech Europe S.A. (CH)

( * ) Notice: Subject to any disclaimer, the term of this patent is extended or adjusted under 35 U.S.C. 154(b) by 0 days.

(21) Appl. No.: 09/273,894

(22) Filed: Mar. 22, 1999

(51) Int. Cl.[7] .................................................. G09G 5/08
(52) U.S. Cl. ........................................ 345/161; 463/36
(58) Field of Search ............................. 345/161, 156; 463/36, 37, 38, 46

(56) References Cited

U.S. PATENT DOCUMENTS

| | | | | |
|---|---|---|---|---|
| 5,691,898 A | * | 11/1997 | Rosenberg et al. | 364/190 |
| 5,751,275 A | * | 5/1998 | Bullister | 345/167 |
| 5,821,920 A | * | 10/1998 | Rosenberg et al. | 345/156 |
| 5,999,168 A | * | 12/1999 | Rosenberg et al. | 345/161 |
| 6,028,593 A | * | 2/2000 | Rosenberg et al. | 345/156 |
| 6,050,718 A | * | 4/2000 | Schena et al. | 364/190 |
| 6,104,382 A | * | 8/2000 | Martin et al. | 345/156 |
| 6,154,201 A | * | 11/2000 | Levin et al. | 345/184 |
| 6,219,033 B1 | * | 4/2001 | Rosenberg et al. | 345/157 |

* cited by examiner

*Primary Examiner*—Bipin Shalwala
*Assistant Examiner*—Vanel Frenel
(74) *Attorney, Agent, or Firm*—Townsend and Townsend and Crew LLP

(57) ABSTRACT

Devices and methods are provided to withstand various off-axis displacements and radial forces which degrade the accuracy of conventional rotational position sensors after repeated use. Specifically, a device is provided having a mounting assembly which reduces the internal bending forces which cause early failure in rotational sensors. In one embodiment, a computer peripheral device includes an input shaft attached to a rotational sensor. The mounting assembly coupled to the rotational sensor prevents motion of the sensor body in only one degree of freedom. Preferably, the mounting assembly allows the sensor body to move with the input shaft in five degrees of freedom, thus minimizing bending forces caused when the sensor body is rigidly secured in one position. The ability to move the sensor body in many degrees of freedom allows forces to be transferred through the device, instead of being absorbed by the sensor mechanisms. Optimally, the rotational sensor will only resist those forces required to rotate the shaft.

27 Claims, 8 Drawing Sheets

DIRECT DRIVE ROTATIONAL SENSOR ADAPTED TO WITHSTAND OFF-AXIS LOADING

BACKGROUND OF THE INVENTION

The present invention relates generally to devices and methods for measuring the position of an object. More particularly, the present invention is useful for measuring the rotational position of a shaft in instruments, such as a joystick or foot pedal, which may transmit off-axis displacements and radial loads into the sensing device. The present invention would be applicable to a variety of endeavors such as computer gaming or robotic control.

Potentiometers and other variable resistors have found widespread use in a variety of electronics-related industries. The computer gaming industry uses these variable resistors and potentiometers to translate hand, foot, and other motions by the user into electrical signal information that a computer can use to interpret the desired actions of the user. For example, during game play, hand movement by the user on an interface such as a joystick may be used to move a cursor on the computer screen for targeting purposes or for on-screen menu item selecting purposes. The accuracy of on-screen cursor movement is directly related to the accuracy of the sensors used in the joystick or user interface. One critical aspect of joystick design is to minimize the amount of movement that the handle must travel before a rotational sensor such as a variable resistor in the joystick registers the movement of the handle. This lag causes imprecise cursor movement that results in poor cursor control on the computer screen. In computer gaming, the greater the lag, the poorer the game play.

Unfortunately, repeated use of the user interface or computer controller such as a joystick or a foot pedal controller, will cause the accuracy of the variable resistors and potentiometers in the device to degrade. As computer gaming enthusiasts probably understand, a computer controller such as a joystick must respond to a variety of sudden and unpredictable movements by the user along a variety of axes. This type of motion may transfer off-axis or radial loads to the sensors used in the computer controller. The low-cost, variable resistors used in computer game controllers are unable to withstand large variations in radial loading and other off-axis forces distributed to the internal mechanisms of the variable resistor during vigorous game play. Additionally, conventional potentiometers and variable resistors are typically rigidly mounted in the computer controllers and end up transferring these loads to the internal mechanisms.

For example, a conventional potentiometer is shown in FIGS. 1A and 1B. Rotation of the shaft S as indicated by arrow 1 changes the resistance of the potentiometer. As shown in FIG. 1B, off-axis forces as indicated by arrows 2 and 4 will cause permanent deformation of the contact wiper W over time, bending the wiper away from the resistive material R even when the shaft S of the variable resister is realigned. The variable resistor functions by having the wiper swipe across the resistive material R to change resistance of the variable resistor based on the rotational position of the wiper. The "lifting off" of the wiper W will eventually destroy the functionality of the variable resistor as the wiper will no longer be in contact with the resistive material R. With the wiper W lifted away, movement of the shaft is not registered by the variable resistor and, thus the computer does not register the hand or other motions of the user on the controller. Conventional sensors do not have mechanisms for compensating or damping these loads on the sensor, and hence these sensors lack both the robustness and accuracy over time to withstand the rigors of computer game play.

Accordingly, it would be desirable to provide improved rotational position sensors that can compensate for off-axis loads transferred from an attached shaft or object. The ability of these improved sensors to compensate for these loads will increase the functional lifespan of the sensors. Preferably, the improved sensor will be a low-cost part which can be mass-produced using known techniques for use in the computer gaming and computer peripheral industry. The sensor further will allow for ease of assembly and thus increase manufacturing throughput.

SUMMARY OF THE INVENTION

The present invention is directed towards devices and methods which can withstand various off-axis displacements and radial forces which degrade the accuracy and life span of conventional rotational position sensors. Specifically, the present invention provides a mounting assembly which reduces the internal bending forces which cause early failure in rotational sensors. A computer peripheral device according to the present invention includes an input shaft attached to a rotational sensor. The mounting assembly coupled to the rotational sensor prevents motion of the sensor body in only one degree of freedom. Preferably, the mounting assembly allows the sensor body to move with the input shaft in five degrees of freedom, thus minimizing bending forces caused when the sensor body is rigidly secured in a fixed position. The ability to move the sensor body in many degrees of freedom allows forces to be transferred through the device, instead of being absorbed by the sensor mechanisms.

In one embodiment, the input shaft and the shaft of the rotational sensor are press-fit together. Advantageously, such a press-fit or interference fit creates a direct-drive connection that improves sensor accuracy by removing slack between a user input and the sensor detecting motion of the user input. Conventionally, such a direct-drive connection would not be possible since it would pass too much bending or off-axis force into the sensor, causing early sensor failure. The mounting assembly of the present invention allows for such a direct-drive connection while preferably increasing life span and accuracy of a rotational sensor.

The input shaft typically forms a connection with a foot pedal or a joystick to receive user input. A protrusion is typically used to connect the sensor body to the mounting assembly and constrain motion of the sensor body in one degree of freedom. Preferably, the mounting assembly prevents rotation of the sensor body about a longitudinal axis of the input shaft. The protrusion, in one embodiment, is otherwise unconstrained by the mounting assembly to move in the channel between two opposing surfaces on the mounting assembly. In other embodiments, the mounting assembly prevents motion of the rotational sensor body in only two degrees of freedom. Optimally, but not necessarily, the rotational sensor will only see those forces required to rotate the shaft of the rotational sensor.

The present invention advantageously improves over conventional sensors that cannot compensate for such loads and exhibited substantially reduced accuracy after extended use. The present invention reduces the effects of these off-axis forces caused by misalignment and manufacturing tolerances associated with mounting of these sensors in various devices. The present invention further reduces the number of moving parts associated with a sensor used for determining the rotational position of an input assembly, thus reducing the overall cost of the device. Simplification of the sensor design and mounting assembly further increases manufacturing throughput of the overall device.

A further understanding of the nature and advantages of the invention will become apparent by reference to the remaining portions of the specification and drawings.

DESCRIPTION OF THE SPECIFIC EMBODIMENTS

The present invention is directed towards devices and methods for providing an improved sensor for measuring the rotational position of a rotatable object. In particular, the present invention advantageously provides a sensor assembly that can withstand various off-axis and radial load conditions while maintaining sensor life span. Such off-axis loads are experienced by sensors in controllers such as joysticks and steering wheels used in computer gaming or computer simulations. Furthermore, the present invention provides devices and methods for using even smaller and more inexpensive potentiometers or variable resistors in computer controller and the like, while maintaining or increasing the useful life span of the potentiometer and maintaining accuracy of the sensor for computer game play. The present invention decreases the number of parts associated with the controller and allows for a simplified direct-drive connection facilitates manufacturing. Reduced assembly time and assembly costs associated with producing controllers or devices using the presently improved sensors further reduces costs per device while increasing throughput. This increased throughput is particularly advantageous in situations where large numbers of new products must be produced in a short period of time. By maintaining the accurate performance of the sensor over its lifetime, the present invention significantly increases the value of the controller to the consumer with the increased quality and life span.

Figure 1A:
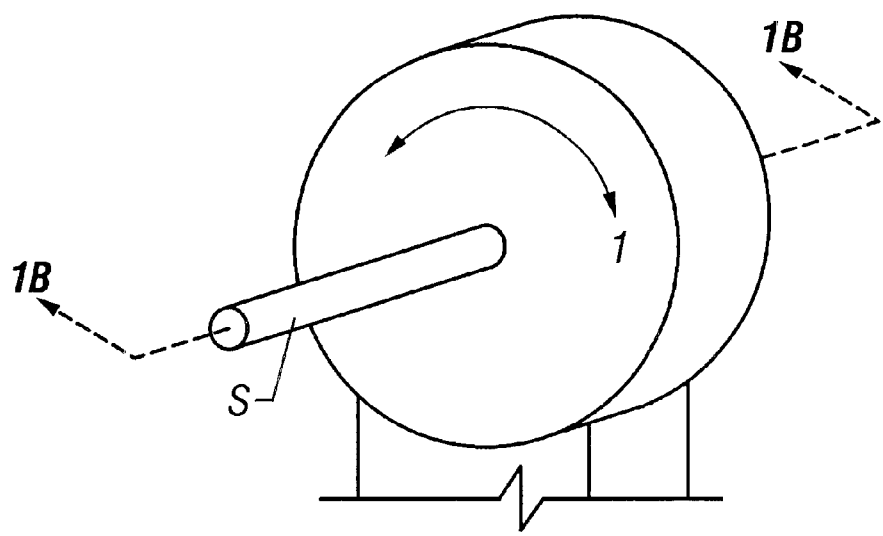
FIGS. 1A and 1B show a variable resistor according to the prior art.
Figure 1B:
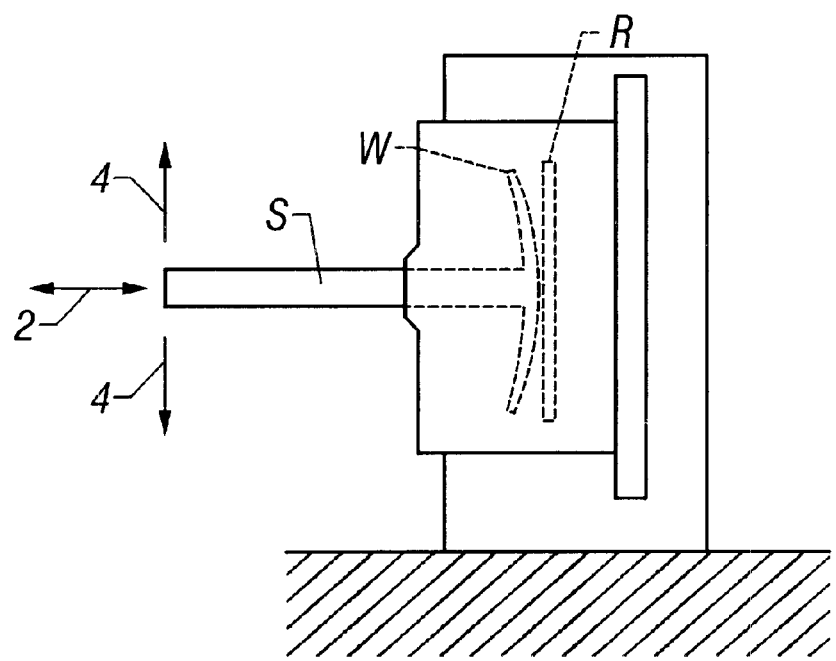

The term "off-axis loads" as used herein refers to those forces transmitted through the shaft of the rotational sensor which may cause deformation of the wiper W. One example of such a force is indicated by arrow 4 as shown in FIG. 1B. Of course, the term off-axis load would also include a variety of other forces applied at angles that are not parallel to the longitudinal axis of the rotational sensor shaft and may bend the wiper W away from the resistive material R.

The term "rotational sensor" as used herein may refer to a variety of devices such as a variable resistor or potentiometer. The rotational sensor may also refer to devices which detect changes in position based on other variables such as impedance and the like.

The term "computer peripheral device" as used herein includes a variety of devices such as joysticks, foot pedal devices, and the like which may be attached to a personal computer (PC) computer system, as is well known in the art. The present invention has application to these PC system accessories and may also find application in other electronics related applications such as in robotic control systems where it would be desirable to monitor the position of an endpoint effector used in robotic manipulators.

The term "degrees of freedom" as used herein refers to the rotational and translational motion which may occur about the X-, Y-, and Z-axis for a three dimensional object. Typically, three-dimensional object have a maximum of six degrees of freedom. For the X-axis, translational movement is surge and rotational movement is roll. For the Y-axis, translational movement is sway and rotational movement is pitch. For the Z-axis, translational movement is heave and rotational movement is yaw.

Figure 2:
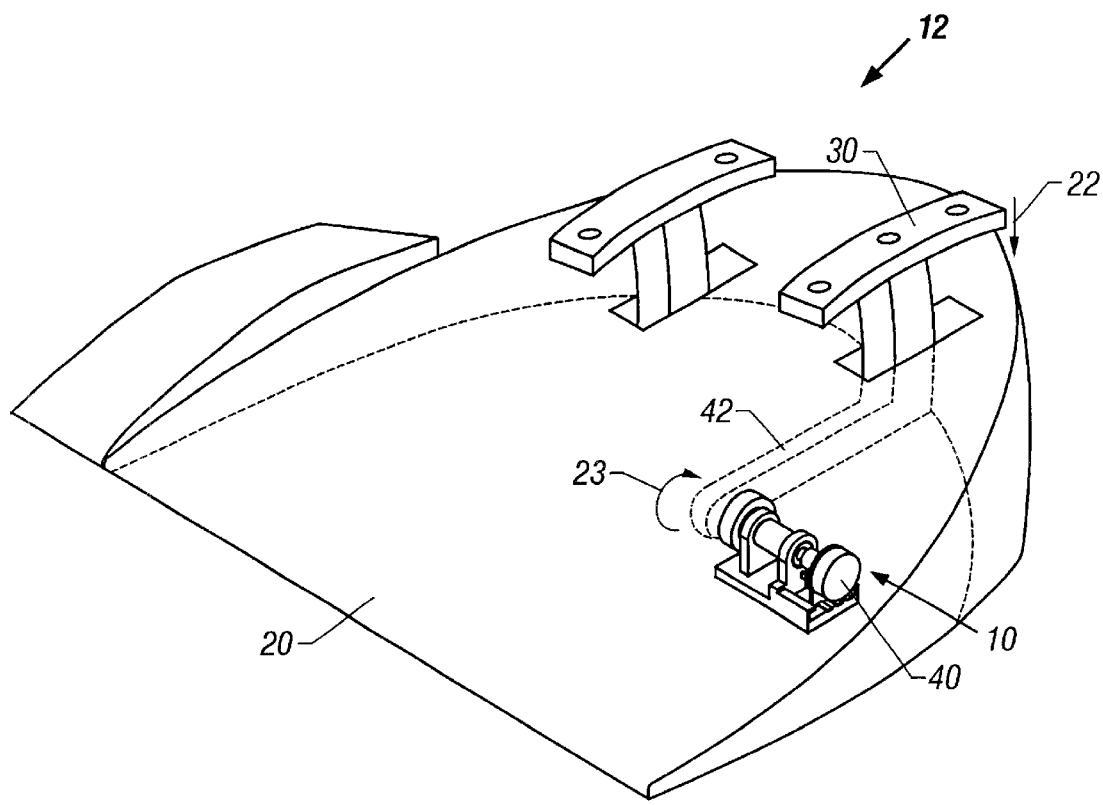
FIG. 2 shows a gas pedal computer game controller having an improved sensor according to the present invention shown in phantom.
Figure 3:
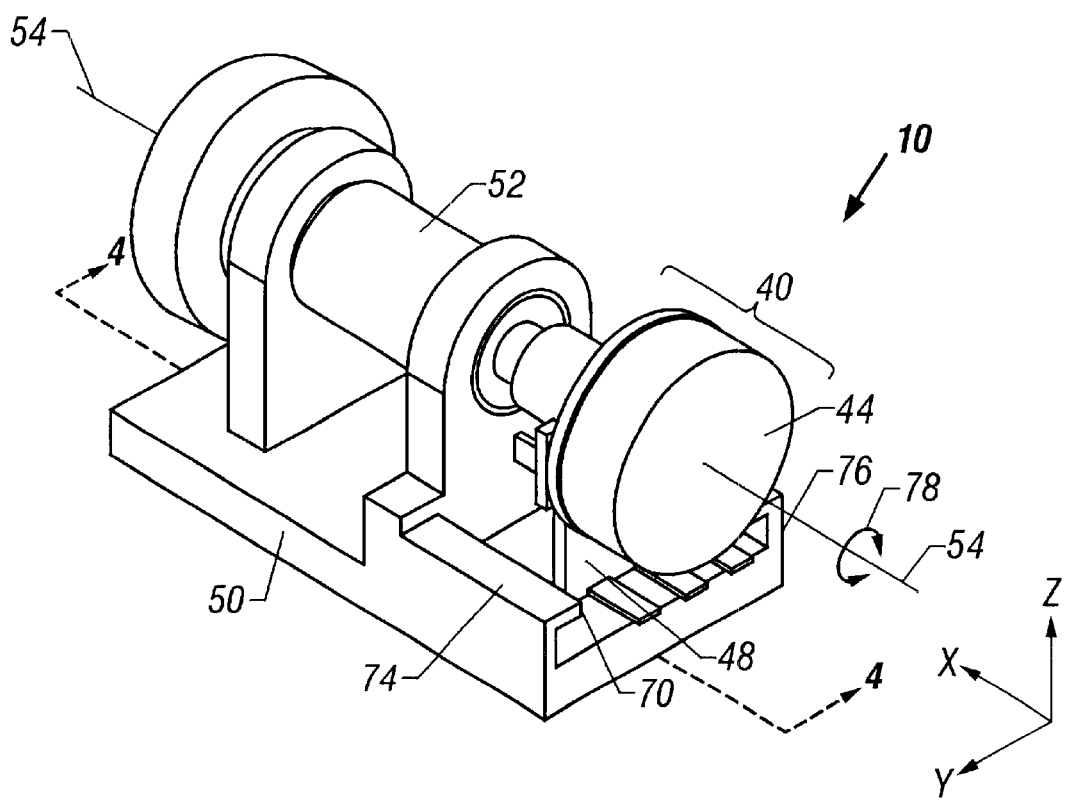
FIG. 3 shows a perspective view of a sensor assembly according to the present invention.

Referring now to FIGS. 2 through 3, one embodiment of a computer controller having an improved sensor assembly 10 according to the present invention will be described. FIG. 2 shows a perspective view of a foot pedal controller 12 used in computer gaming and having an improved sensor assembly 10. The sensor assembly 10 of the present invention is shown in phantom lines within the housing 20 of the controller. The sensor assembly 10 is coupled to one of the foot pedals 30 which can be depressed as indicated by arrow 22 to cause rotation as indicated by arrow 23. The sensor assembly 10 detects this rotation and, in automobile racing simulations, interprets this information for determining the level braking or acceleration. In an exemplary embodiment, the present sensor assembly 10 have been tested to withstand about 1,000,000 cycles without reaching failure.

Referring now to FIG. 3, the improved sensor assembly 10 includes a rotational sensor 40 and a mounting assembly 50 that supports an input shaft 52 receiving input from the user. Arm 42 couples the input shaft 52 to the rotational sensor 40 which measures the user input. The arm 42 may be integrally formed with the pedal 30 and/or with the input shaft 52. In this embodiment, the mounting assembly 50 only prevents motion of the sensor body 44 in this one degree of freedom. Preferably, but not necessarily, the mounting assembly 50 prevents the sensor body 44 from rotating about the longitudinal axis 54 of the input shaft 52. Preferably, the rotational sensor body 44 is otherwise free to move in the other degrees of freedom. As will be described in FIGS. 5–7, the ability of the sensor 40 to move with the shaft 52 which substantially reduces the effect of off-axis forces which may otherwise damage the internal mechanisms of the rotational sensor.

Figure 4:
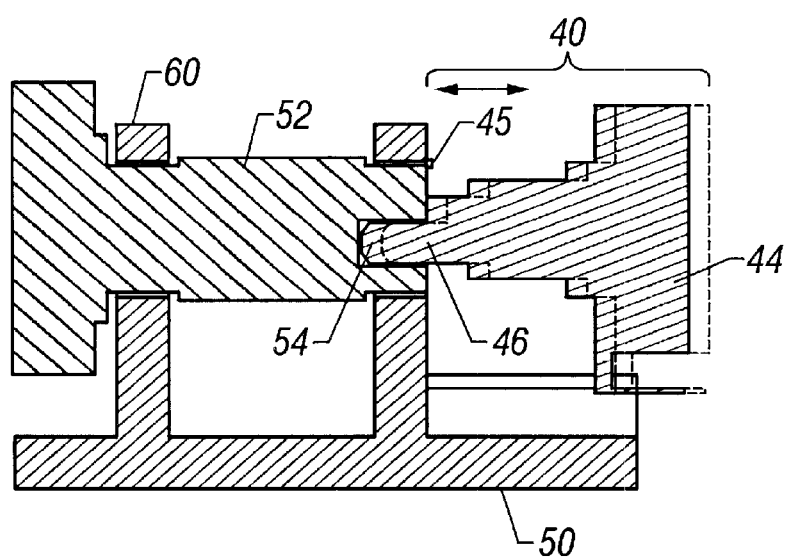
FIG. 4 is cross sectional view of the sensor assembly of FIG. 3.

As seen in FIG. 4, there is typically some clearance 45 between the support arm 60 of the mounting assembly 50 and the input shaft 52. This clearance allows the input shaft 52 to rotate freely in the mounting assembly 50 without using bearings or similar devices. The input shaft 52 has a lumen 54 which receives a sensor shaft 46 from the rotational sensor 40. In the preferred embodiment, the shaft 46 has a press-fit connection with the lumen 54 of the input shaft 52. This interference press fit creates a rigid, direct-drive connection that substantially eliminates slack between a user input such as foot pedal 30 and the shaft 46 of the variable resister 40 used to detect movement. Of course, other techniques besides interference fitting may be used to form a direct-drive connection and such techniques are well known in the art. This interference fit restrains the rotational sensor 40 from detaching from the shaft 52 while the device is in use. The shaft 46 of the rotational sensor 40 can be press fitted along a wide variance on the shaft axis without affecting the ability of the sensor to sense rotational movement.

A direct-drive, rigid connection is preferred since it removes slack between a user input such as pedal 30 and the rotational sensor 50 used to detect rotational position. Generally, increasing the number of joints and connections, such as through the use of gears or intermediate linkages, increases the amount of movement that occurs in the user input before to the rotational sensor 50 of a sensor assembly 10 registers the movement. The direct drive connection reduces slop or lag exhibited by conventional game controller responsiveness and thus improves game play. The direct drive connection also reduces the number of parts used in the device and thus also reduces assembly time spent on the overall device.

Figure 5:
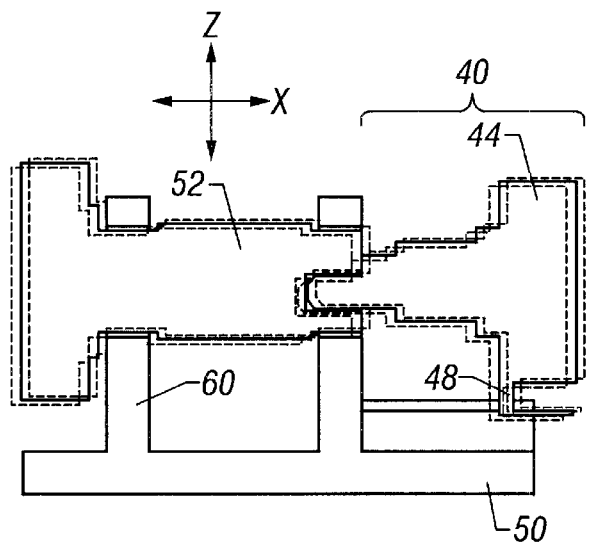
FIGS. 5–7 show the various degrees of motion allowed by a mounting assembly in the sensor assembly of FIG. 3.
Figure 6:
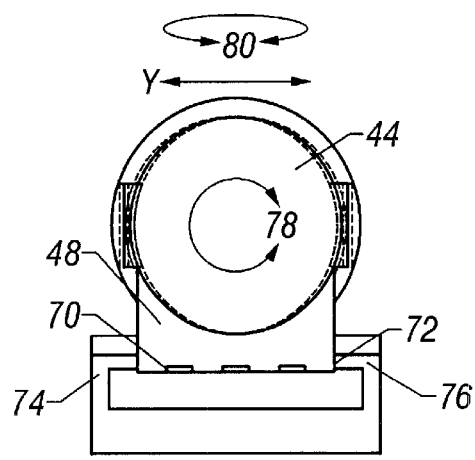
Figure 7:
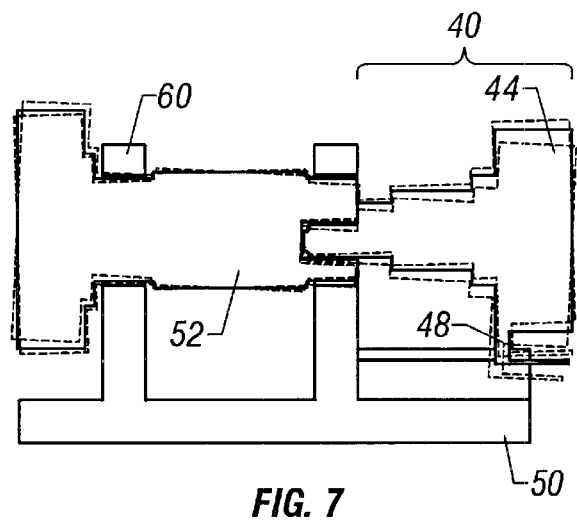

Referring now to FIGS. 5–7, the freedom of motion of the sensor body 44 and input shaft 52 will now be described. As discussed further below, allowing the sensor body 44 to move with the input shaft in preferably all but one degree of freedom increases the life span of the resistor 40. Referring to FIG. 3, the rotational sensor 40 has a protrusion 48 which extends from the sensor body 44. The protrusion 48 may be a printed circuit board (PCB), a rectangular tab, or similar part that extends from the body 44 of the resistor. As shown in FIGS. 5 and 6, the mounting assembly 50 has a first and second opposing surfaces 70 and 72 mounted on ribs 74 and 76. The surfaces 70 and 72 form a slidable connection with the protrusion 48. These surfaces 70 and 72 are oriented to prevent rotation of the sensor body 44 about the longitudinal axis 54 as indicated by arrows 78. As shown in FIG. 6, the ribs 74 and 76 form a "two point" contact with the protrusion 48. The contact off the centerline of the sensor body 44 allows for self-aligning (i.e. freedom of motion) of the sensor with the input shaft 52 without contact wiper lifting.

In the preferred embodiment, although the rotational sensor body 44 is constrained in one degree of freedom, the body 44 otherwise free to move with the input shaft 52 in the remaining degrees of freedom. For example, FIG. 5 shows that the rotational sensor body can move with the input shaft 52 in surge (translation in the X axis) and heave (translation in the Z axis). FIG. 6 shows that the sensor body 44 is free to move with the input shaft in sway (translation in the Y axis). The motion in FIG. 6 may also be considered to be yaw (rotation about the Z axis) as indicated by arrow 80. FIG. 7 shows that the sensor body 44 can move in pitch (rotation about the Y axis). As can be seen in FIGS. 5 through 7, the opposing surfaces 70 and 72 only constrain the rotation of the sensor body 44 about the longitudinal axis 54 (roll). Preferably, but not necessarily, the sensor body 44 and the input shaft 52 move as a single unit. The degree of motion of the sensor body 44 depends in part on the clearance between the support arm 60 and the input shaft 52. In some embodiments, the support arm 60 does not fully surround the input shaft in the manner shown in FIG. 3, but may only partially enclose or only support the bottom surface of the input shaft 52. Such a configuration allows for a greater motion by the input shaft 52.

To extend the life of the rotational sensor, the sensor assembly 10 of the present invention substantially eliminates off-axis forces from causing strain in the internal mechanisms of the sensor 40 which may cause the lifting of the rotating wiper contacts (FIG. 1B). As illustrated in FIGS. 5–7, the present invention eliminates off-axis forces from reaching the sensor by allowing the sensor body 44 to move up/down/forward/back (FIG. 5), side to side (FIG. 6), and pitch/roll (FIG. 7) without inducing bending forces between the sensor shaft 46 and the sensor body 44. Since the torque required to rotate the sensor shaft 46 is very low the force on the protrusion 48 or PCB is very low and no damage can occur. In this manner, the only forces that the internal mechanisms of the sensor 40 sees are those required to rotate the wiper in the sensor. Accordingly, the mounting assembly 50 can increase the life of a conventional sensor while allowing for a direct-drive connection which improves sensor performance by eliminating slack.

Figure 8:
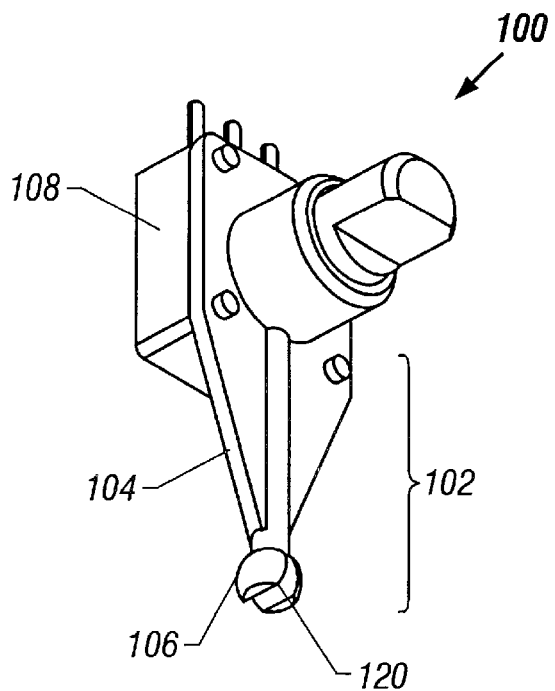
FIGS. 8–9 show embodiments of improved sensors according to the present invention.
Figure 9:
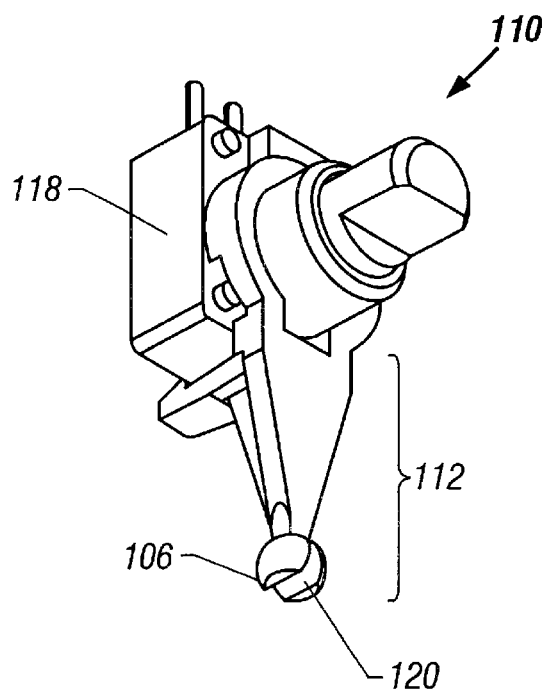

Referring now to FIGS. 8 and 9, another embodiment of an improved sensor according to the present invention will be described. As shown in FIGS. 8 and 9, instead of relying on a PCB to prevent rotation of the body portion 108, the sensors 100 and 110 have specially designed protrusions 102 and 112 that extends from the body portions 108 and 118 respectively. The spherical distal tip 106 provides the type of interface with the mounting assembly 150 which allows motion in many degrees of freedom while preventing motion in at least one degree of freedom. Typically, the spherical distal tip 106 has a diameter between about 2 and 4 mm, preferably about 3 mm, and the protrusion 102 has a total length of between about 3 and 20 mm, preferably about 14 mm. The rotational sensor 100 of FIG. 8 has a protrusion 102 with an elongate portion 104 and a spherical distal end 106. The protrusions of FIGS. 8–9 are designed for use with rotational sensors of smaller size than the resistor shown in FIG. 3. The spherical distal end 106 also provides greater ease of motion in the unconstrained degrees of freedom.

The spherical distal end 106 shown in FIGS. 8 and 9 will define an interface with a mounting assembly 150 (FIG. 10) to constrain the motion of the rotational sensor body 108 while allowing the body to move the remaining degrees of freedom. The protrusion 102 shown in FIG. 8 is formed as part of the housing of the rotational sensor assembly 100. FIG. 9 shows another embodiment of a rotational sensor 110 according to the present invention where the protrusion 112 is a separate element that is adapted to be mounted about the rotational sensor body 118. This allows the protrusion 112 to be mounted onto conventional rotational sensors or rotational sensors which do not have a protrusion of sufficient size for mounting in the mounting assembly 150.

As can be seen in FIGS. 8 and 9, a slot 120 is formed in the spherical distal end 106 in both sensors 100 and 110. The slot 120 and the spherical distal end 106 will allow the distal end to be slightly compressed when placed within the mounting assembly or bracket 150. The slot 120 which may extend through the spherical portion of the protrusion 102, allowing for variance in the manufacturing tolerances of the distal tip 106 while ensuring ease of assembly and a snug fit with the mounting assembly 150. For example, the sphere may have a diameter of approximately 3.15 mm while the mounting assembly 150 a slot 156 of approximately 3 mm in diameter. Typically, the spherical distal tip 106 is made of a plastic or polymer material which provides for a certain level flexibility. The overlap between the outer diameter of the spherical tip 106 and the slot 156 defines an interface preferably having only two contact points and an interference fit.

As plastics and hard polymers tend to creep, eventually the stress created by the interference fit will reach a point on the stress curve of the material where the creep stops, but there will still be no clearance between the rib 152, rib 154, and the spherical distal tip 106. This ensures a snug fit between the mounting assembly 150 and the spherical tip 106 even though manufacturing tolerances used in low-cost, high volume production may not create parts having repeatable sizes and specs. The slot 120 in the spherical distal end 106 may, in some embodiments, include a bias member such as a spring or compressible material to maintain contact between the end 106 and the ribs 152 and 154. Forming the slot 120 in the protrusion may also be construed as creating a bias member at the distal end of the protrusion.

Figure 10:
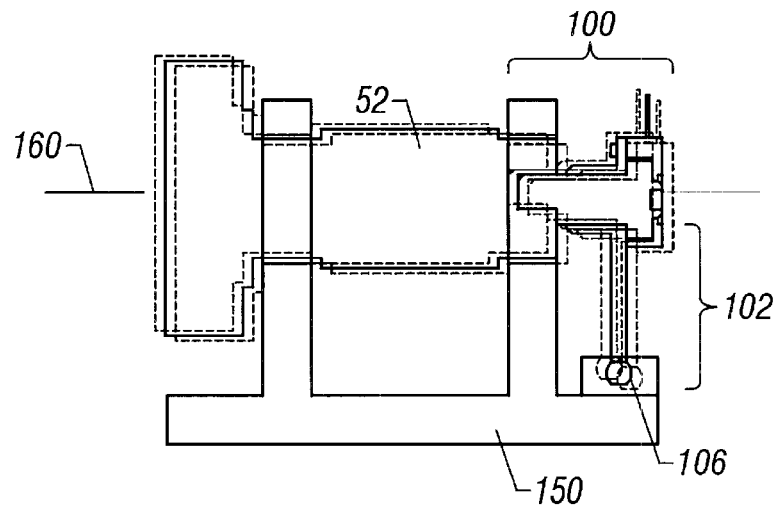
FIGS. 10–12 show the various degrees of motion allowed by a mounting assembly using a sensor as shown in FIG. 8.
Figure 11:
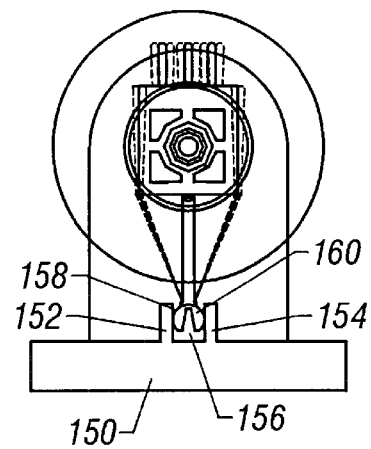
Figure 12:
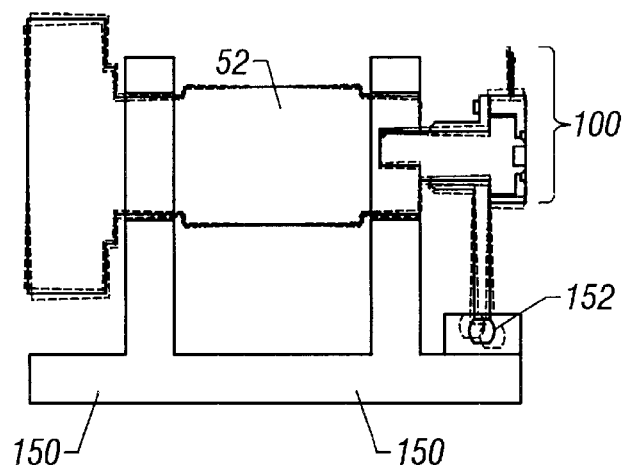

Referring now to FIGS. 10 through 12, an input shaft 52 coupled to a sensor assembly 100 as shown in FIG. 8 will be described in further detail. As seen in FIGS. 10 and 11, the mounting assembly 150 has a rib 152 and 154 that define a slot 156 to receive the spherical distal end 106 of the protrusion 102. The ribs 152 and 154 define opposing surfaces 158 and 160. As seen in FIGS. 10 and 11, the slot 156 is typically a rectangular slot. As seen in FIG. 10, the spherical distal end 106 can move vertically or horizontally between the surfaces 158 and 160. The ribs 152 and 154 prevent the rotational sensor body 108 from rotating about the axis 160. Similar to the mounting assembly shown in FIGS. 5 through 7, the mounting assembly 150 and protrusion 102 allow the rotational sensor body 108 to move with the input shaft 52 in several, preferably five, degrees of freedom. The rotational sensor 110 may be used in place of the sensor assembly 100 and provide similar performance and freedom of motion. The protrusion 112 is particularly suited for use with small potentiometers such as a 9 mm sized potentiometers which needs the protrusion attachment to most effectively engage the mounting assembly 150.

Figure 13:
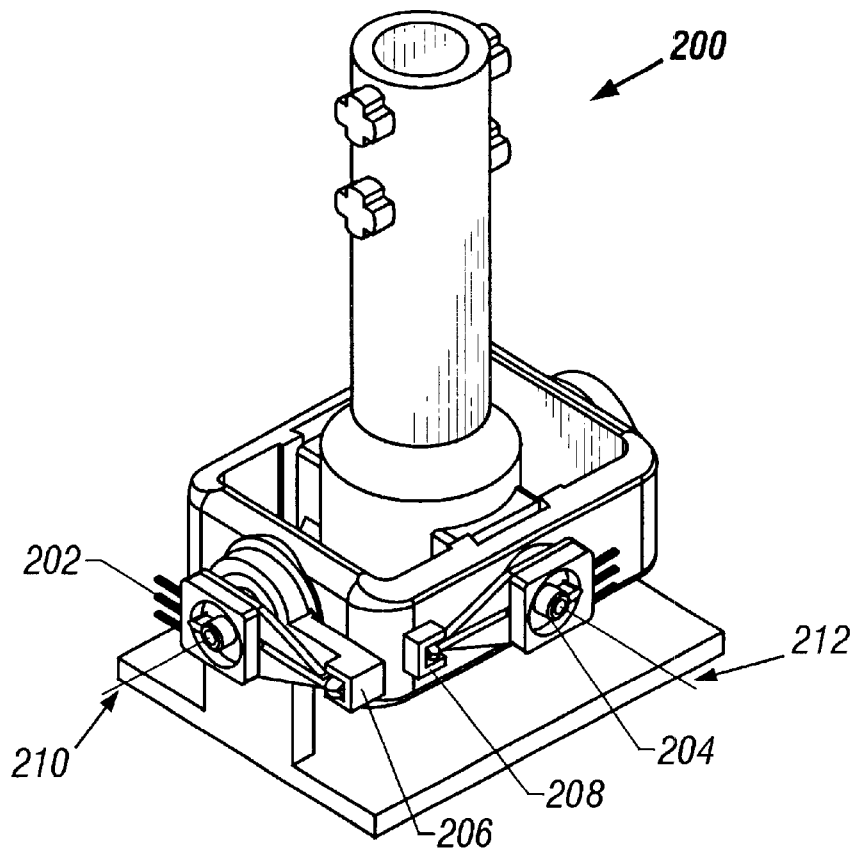
FIG. 13 shows a joystick gimbal using the sensor of FIG. 8.

Referring now to FIG. 13, the rotational sensors 100 and 110 shown in FIGS. 8 and 9 may be adapted for use with a joystick controller 200. As seen in FIG. 13, the rotational sensors 202 and 204 are mounted onto the joystick controller 200 with brackets 206 and 208 which use ribs to define a slot therein. The brackets 206 and 208 will prevent the body of the rotational sensors 202 and 204 from rotating about axes 210 and 212, respectively. Similar to the mounting assemblies for use with the foot pedal controller of FIG. 2, these rotational sensors 202 and 204 are otherwise free to move with the input shafts to which the sensors are connected.

Figure 14:
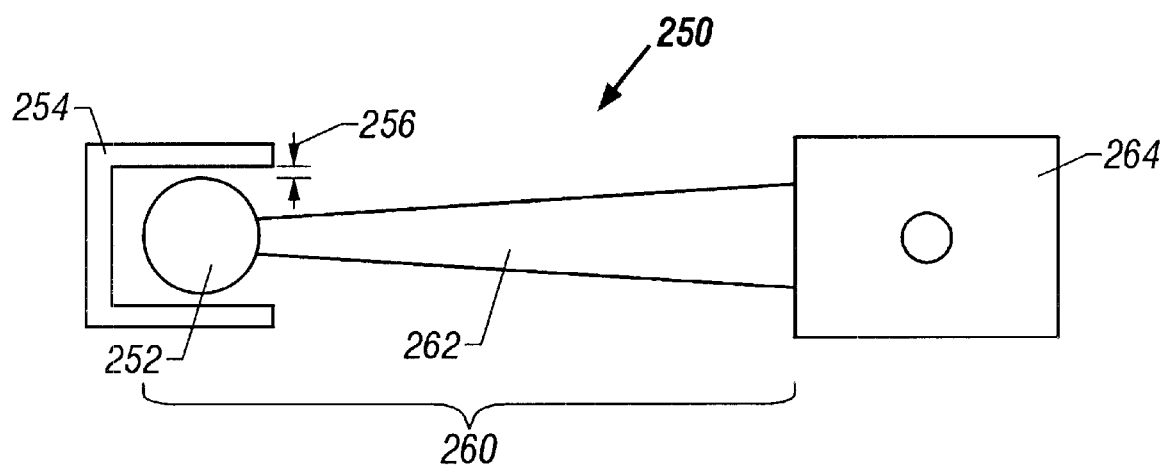
FIG. 14 shows another embodiment of a sensor according to the present invention.

In a still further embodiment as shown in FIG. 14, the sensor 250 has a spherical distal tip 252 without a slot and fitted within the mounting assembly 254. Although the embodiments of FIGS. 8 and 9 are preferred, the embodiment of FIG. 14 may also be used to improve over conventional rotational sensors. Due to manufacturing tolerances associated with the low cost production, a narrow gap 256 may exist between the spherical tip 252 and an inner surface of the mounting assembly or bracket 254. The protrusion 260 has an elongate portion 262 of extended length to minimize the effect that a gap 256 may have on constraining the rotation of the sensor body 264. The longer the elongate portion 262, the smaller the angular rotation of body 264 before the slack between the distal tip 252, the mounting bracket 254 is taken up by the rotation of the arm and rotational sensor. In theory, an infinitely long elongate portion 262 would substantially eliminate any effect the gap 256 would have on the rotation or responsiveness of the sensor 250. It should be understood, of course, that although a gap 256 may exist between the spherical tip 252 and the mounting bracket 250, the mounting bracket still substantially prevents rotation of the body 264 while allowing for substantially greater motion of the body portion in at least three other degrees of freedom. Preferably, the device will have less than about 1° of angular rotation. As seen in FIG. 14, the gap is typically not more than about 0.05 mm greater (on each side) than the width of the portion of the protrusion 102 which engages the slot. Beneficially, adding the protrusion 260 to a very small potentiometer allows the small potentiometer to have qualities of a larger device (e.g. less angular rotation of the protrusion and the sensor body before reaching lock up against the mounting assembly).

Figure 15:
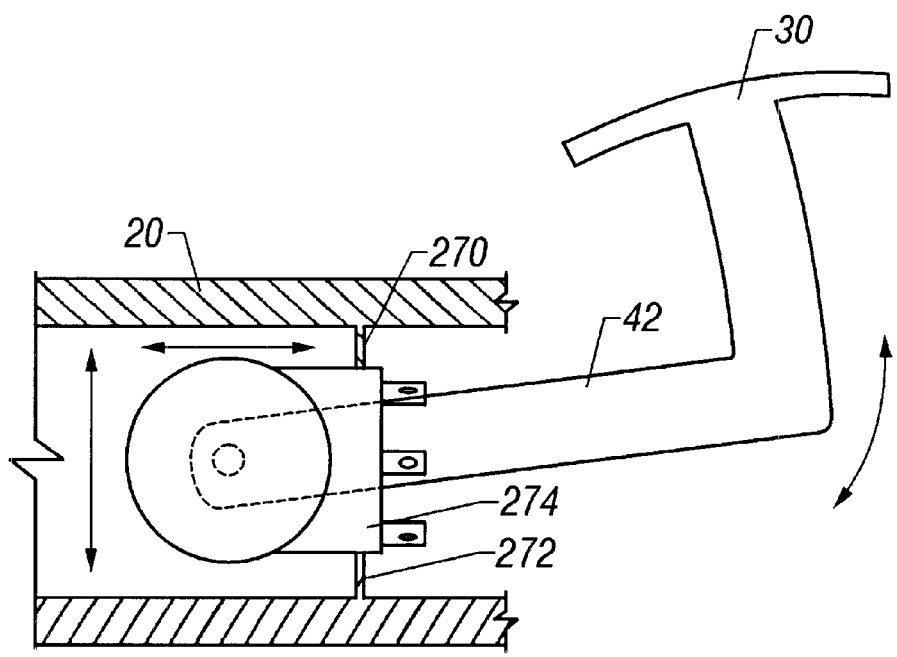
FIG. 15 is a partial cross-sectional view of a rotational sensor mounted in a computer peripheral device housing.
Figure 16A:
FIGS. 16A–16C show alternative embodiments of the distal end of the sensor body protrusion.
Figure 16B:
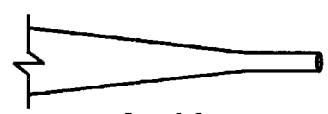
Figure 16C:
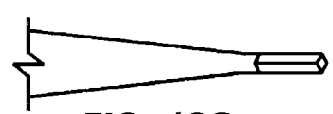

While all the above is a complete description of the preferred embodiments of the inventions, various alternatives, modifications, and equivalents may be used. For example, other embodiments of the present invention may have more than one rotational sensor or rotational sensor monitoring each axis of motion of the controller. In another alternate embodiment, the mounting assembly in FIG. 15 may comprise of an upper rib 270 and lower rib 272 to contain the protrusion 274 therebetween. The length of the protrusion may be lengthened or shortened as desired to mate with the mounting assembly. The sensors may have more than one protrusion on the body portion to prevent motion in at least one degree of freedom or possibly two degrees of freedom. The ribs on the mounting assembly may be designed to extend upward and contact both the protrusion and the body of the resistor. In some embodiments, it may be possible that the ribs of the mounting assembly only contact the body of the resistor. Although a spherical shape is preferred, the distal tip of the protrusion may have other shapes such as a disc, a cylinder, or a prism which provide some, albeit lesser degrees of freedom (FIGS. 16A–16C). The spherical shape may be a separate attachment or integrally formed with the protrusion. The sensor and the device housing may also be made of a variety of materials such as aluminum, steel, silicon, or non-corrosive materials. The rotational sensor may operate based on changes in resistance, impedance, or the like to measure change in rotational position. Although the foregoing invention has been described in detail for purposes of clarity of understanding, it will be obvious that certain modifications may be practiced within the scope of the appended claims.

What is claimed is:

1. A computer peripheral device comprising:

a housing;

an input shaft;

a rotational sensor having a sensor body and a sensor shaft, the sensor shaft being attached to the input shaft, the rotational sensor comprising a protrusion connected to the sensor body; and a mounting assembly on said housing coupled to said protrusion of said rotational sensor, said mounting assembly having a plurality of surfaces positioned to contact said protrusion with an interference fit to prevent motion of the sensor body in only one degree of freedom such that the sensor body is movable with said input shaft except in said one degree of freedom, said protrusion being slidable relative to said mounting assembly.

2. A device as in claim 1 wherein said mounting assembly prevents rotation of the sensor body about a longitudinal axis of the sensor shaft.

3. A device as in claim 1 wherein said sensor shaft of said rotational sensor forms a rigid connection with said input shaft, said sensor shaft moving with said input shaft.

4. A device as in claim 1 wherein said input shaft has a lumen and said rotational sensor shaft is mounted within said lumen with a direct-drive, interference fit connection.

5. A device as in claim 1 wherein said sensor body of said rotational sensor moves with the input shaft in only five degrees of freedom.

6. A device as in claim 1 wherein said input shaft forms a connection with a foot pedal to receive user input.

7. A device as in claim 1 wherein said input shaft forms a connection with a joystick to receive user input.

8. A device as in claim 1 wherein said protrusion comprises a rectangular tab having a first contact surface and a second contact surfaces.

9. A device as in claim 1 wherein said distal end of the protusion has a bias member allowing for compression of the distal end.

10. A device as in clam 1 wherein said protrusion comprises an elongate member having a spherical distal end contacting said surfaces of the mounting assembly.

11. A device as in claim 10 wherein said spherical distal end has a slot therethrough.

12. A device as in claim 1 wherein said protusion is integrally formed with the sensor body.

13. A device as in claim 1 wherein said mounting assembly comprises a bracket having two opposing surfaces defining a channel for slidably receiving a protrusion on said rotational sensor.

14. A device as in claim 13 wherein said mounting assembly contacts locations on said protrusion that prevent rotation of the sensor body about a longitudinal axis of the input shaft;

said protrusion unconstrained by the mounting assembly to move in the channel between the two opposing surfaces.

15. A device as in claim 13 wherein said opposing surfaces are in contact with said first surface and second surface of the protrusion and prevent the rotation of the rotational sensor body about a longitudinal axis of the input shaft.

16. A device as in claim 13 wherein said mounting assembly comprises a U-shaped bracket.

17. A device as in claim 13 wherein the mounting assembly is integrated onto said housing, said mounting assembly comprising an upper rib on the housing defining a first contact point with said protrusion and a lower rib on the housing defining a second contact point, wherein said contact points prevent body portion rotation about a longitudinal axis of the shaft and allow relative motion of the rotational sensor body portion in at least three of the remaining degrees of freedom.

18. A computer peripheral device comprising:

a housing;

an input shaft;

a rotational sensor having a sensor body and a sensor shaft, the sensor being attached to the input shaft, the rotational sensor comprising a protusion connected to the sensor body; and sensor mounting means on said housing contacting said protrusion with an interference fit for substantially constraining said sensor body from rotating about a longitudinal axis of the input shaft while allowing relative motion of the sensor body with respect to said housing in at least three other degrees of freedom including sliding therebetween.

19. A device as in claim 18 wherein said sensor mounting means comprises two opposing surfaces defining a channel that slidably receives a protrusion on said sensor body of said rotational sensor.

20. A device as in claim 18 wherein said sensor mounting means prevents rotational motion of the sensor body about a longitudinal axis of the input shaft.

21. A device as in claim 18 wherein said sensor body comprises a protrusion coupled to said mounting means, said protrusion having a distal portion with a shape selected from the group consisting of a sphere, a cylinder, a disc, and a prism.

22. A device as in claim 18 wherein said sensor mounting means defines a slot having a slot width not more than 0.05 mm greater on each side than a width of a protrusion coupled to the sensor body.

23. A device as in claim 18 wherein said sensor body has a protrusion coupled to said sensor mounting means, has an elongate portion with a length sufficient to maintain angular rotation of the sensor body less than about 1° of total rotation about said longitudinal axis of the input shaft.

24. A sensor mountable on a mounting assembly for measuring a rotational output of a user input, said sensor comprising:

a sensor body connected to a protrusion and a sensor shaft wherein said sensor body is adapted to define an interface with said mounting assembly forming an interference fit between said protrusion and said mounting assembly to prevent rotational movement of the sensor body in only one axis of rotation of said sensor shaft while allowing relative motion of the sensor body with respect to said mounting assembly in at least three other degrees of freedom including sliding therebetween.

25. A device as in claim 24 wherein said sensor body comprises a protrusion for defining said interface with the mounting assembly.

26. A device as in claim 24 wherein said protrusion has a sphere-shaped distal end.

27. A method for manufacturing a computer peripheral device, the method comprising:

coupling a rotational sensor mounting assembly to a housing;

providing a rotational sensor having a sensor body and a sensor shaft, the rotational sensor comprising a protrusion connected to the sensor body; and securing the sensor shaft of the rotational sensor to an input shaft and mounting the sensor body with the mounting assembly, wherein said mounting assembly has a plurality of surfaces positioned to contact said protusion with an interference fit to substantially prevent motion of the sensor body in only one degree of freedom relative to the housing such that the sensor body is movable with the input shaft except in said one degree of freedom.

* * * * *